United States Patent [19]
Taylor

[11] Patent Number: 5,862,907
[45] Date of Patent: Jan. 26, 1999

[54] CONTROL SYSTEM AND MODULE FOR AN ACCUMULATION CONVEYOR

[75] Inventor: Bryan D. Taylor, Bono, Ark.

[73] Assignee: Hytrol Conveyor Company, Inc., Jonesboro, Ark.

[21] Appl. No.: 758,078

[22] Filed: Nov. 27, 1996

[51] Int. Cl.[6] .................................................. B65G 13/06
[52] U.S. Cl. .............................. 198/781.05; 198/781.06; 198/783
[58] Field of Search ........................... 198/460.1, 781.01, 198/781.05, 781.06, 783

[56] References Cited

U.S. PATENT DOCUMENTS

| | | | |
|---|---|---|---|
| 4,453,627 | 6/1984 | Wilkins | 198/783 X |
| 4,562,920 | 1/1986 | Jaffre | 198/783 X |
| 5,060,785 | 10/1991 | Garrity | 198/781.6 |
| 5,086,910 | 2/1992 | Terpstra | 198/781.06 X |
| 5,285,887 | 2/1994 | Hall | 198/460.1 |
| 5,318,167 | 6/1994 | Bronson et al. | 198/781.06 X |
| 5,358,097 | 10/1994 | Bakkila et al. | 198/783 X |
| 5,730,274 | 3/1998 | Loomer | 198/781.06 X |

Primary Examiner—James R. Bidwell
Attorney, Agent, or Firm—Herzog, Crebs & McGhee, LLP

[57] ABSTRACT

An accumulating conveyor is divided into a plurality of accumulating zones from an infeed end to a discharge end. An accumulation module is associated with each accumulating zone and includes a photo electric sensor, a microprocessor, and input/output connections. Each module is coupled to an actuator that controls the driving of the associated accumulating zone, either engagement or disengagement of the driving force to either move or stop the product thereon. The sensor detects the presence or absence of a product within its zone and communicates the same to the microprocessor. The modules may be set in a singulation mode or a slug mode, the mode determining the throughput of the product within the zone depending on the presence or absence of a product on the upstream and downstream accumulating zone. An enable/disable sleep and jam mode is incorporated into the microprocessor decision process to stop the drive force for the particular zone when no product is forthcoming and to try to dislodge any jammed package from a zone and stop the flow of product upstream thereof. Each accumulation module is in communication with the adjacent accumulation modules both upstream and downstream thereof, where possible, via integral plug-ins to aid in determining whether to move or stop the product depending on the selected modes of operation.

20 Claims, 6 Drawing Sheets

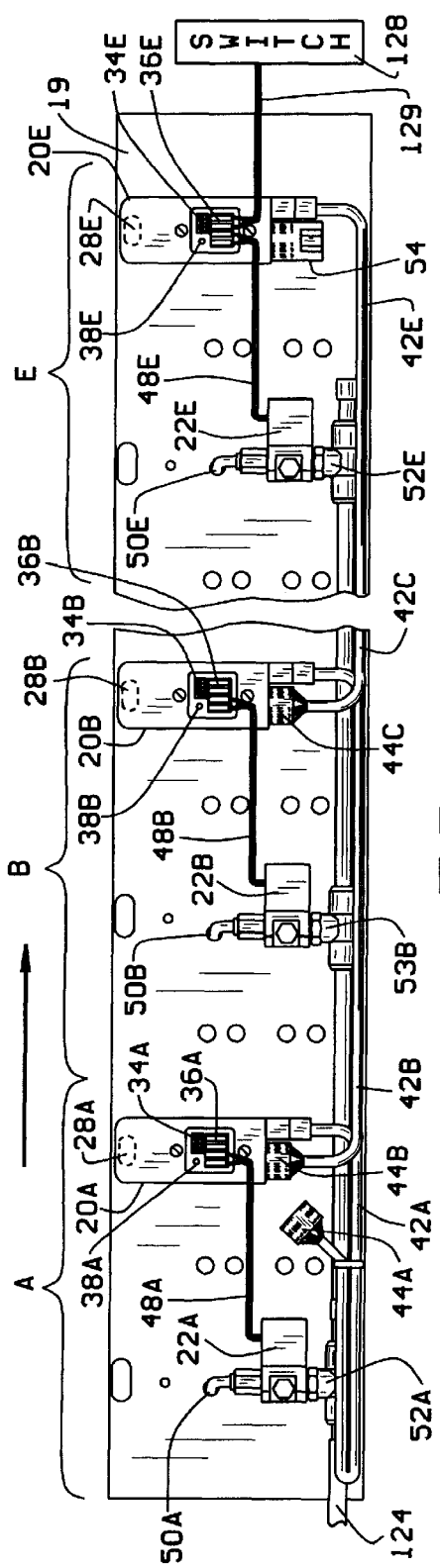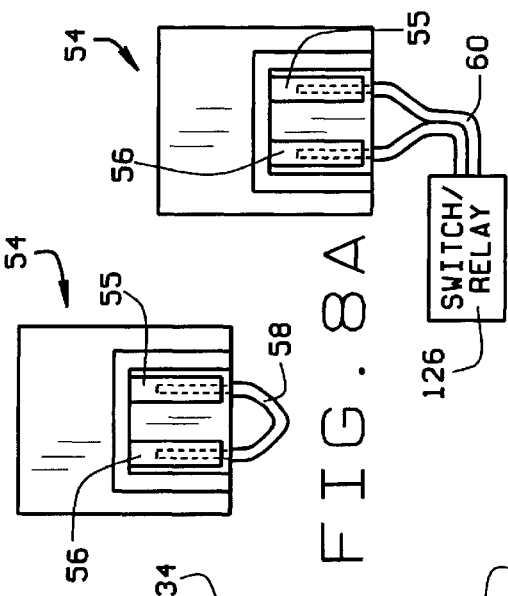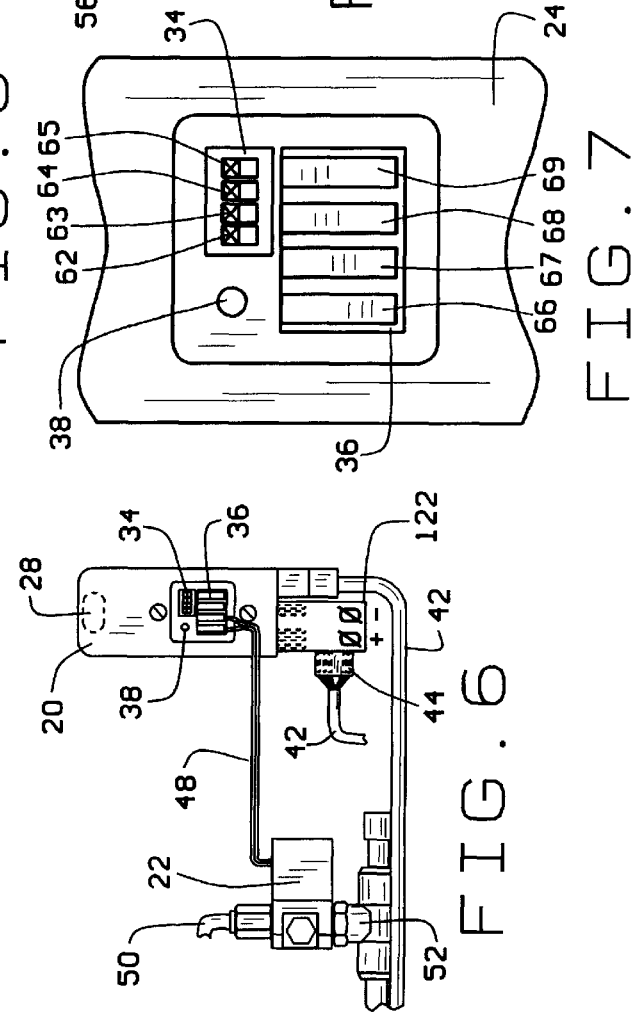

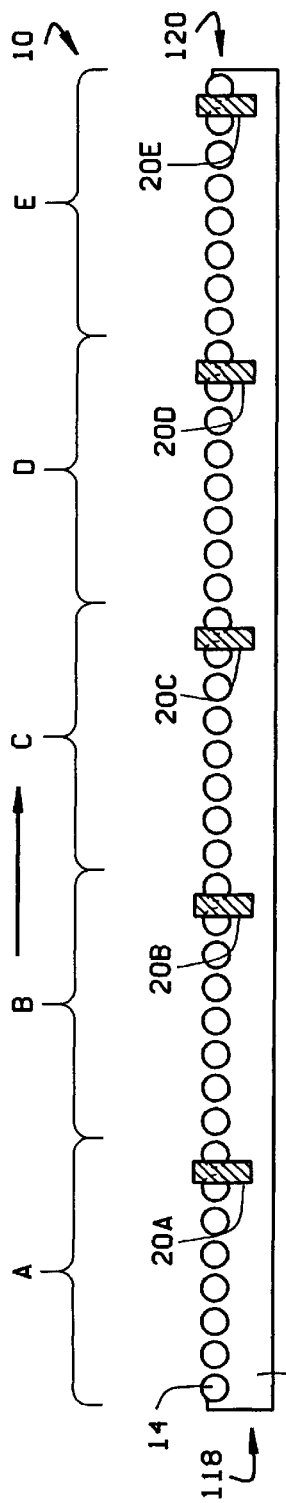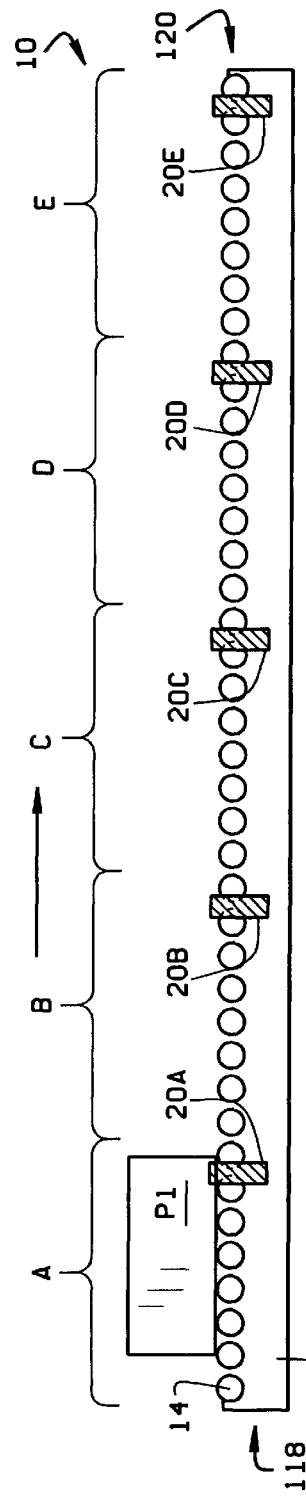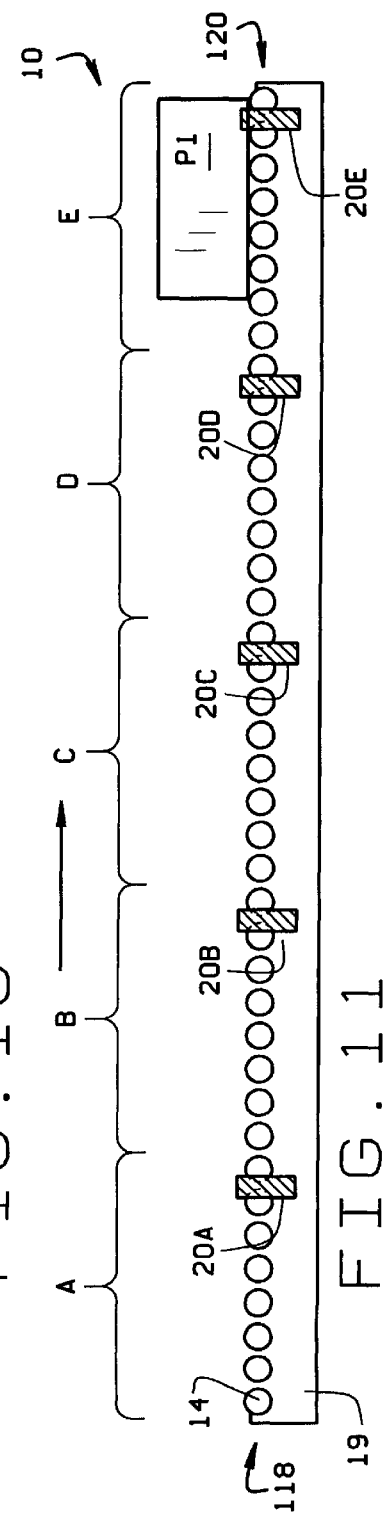

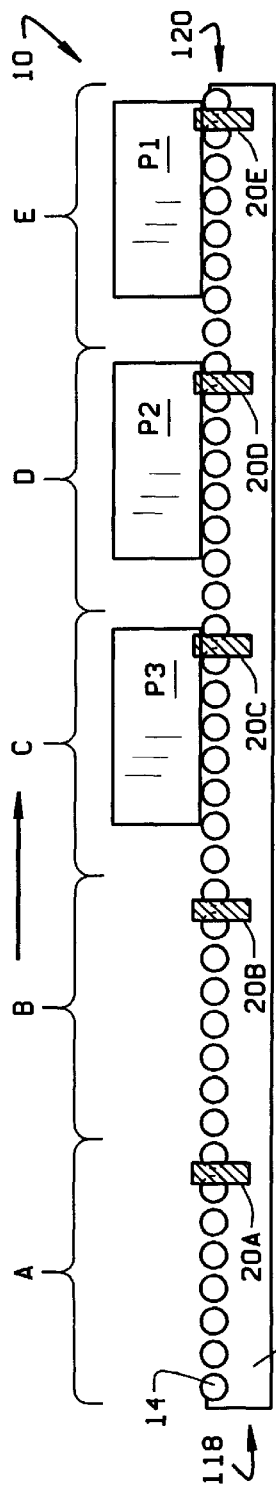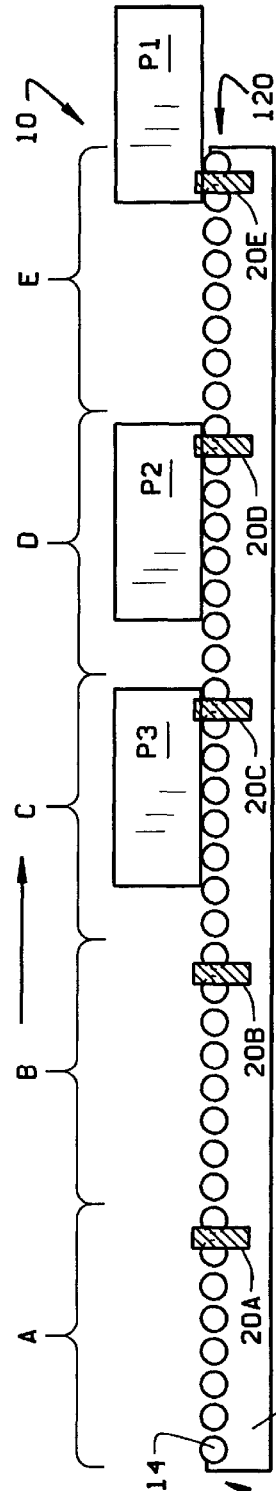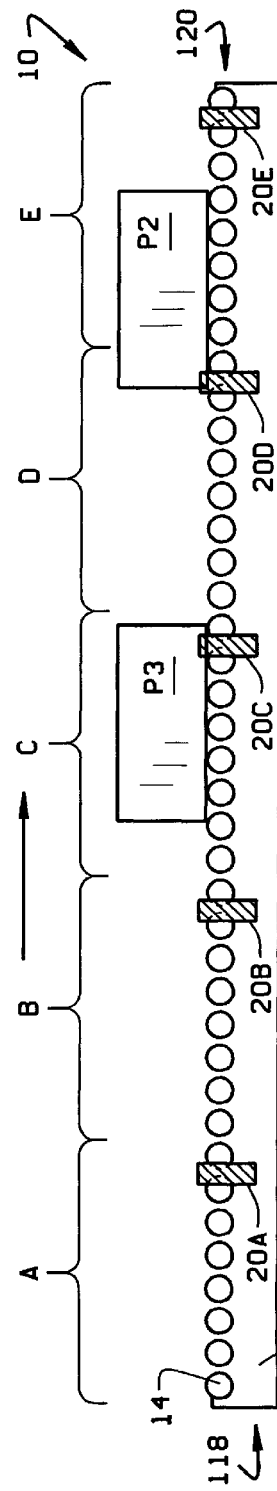

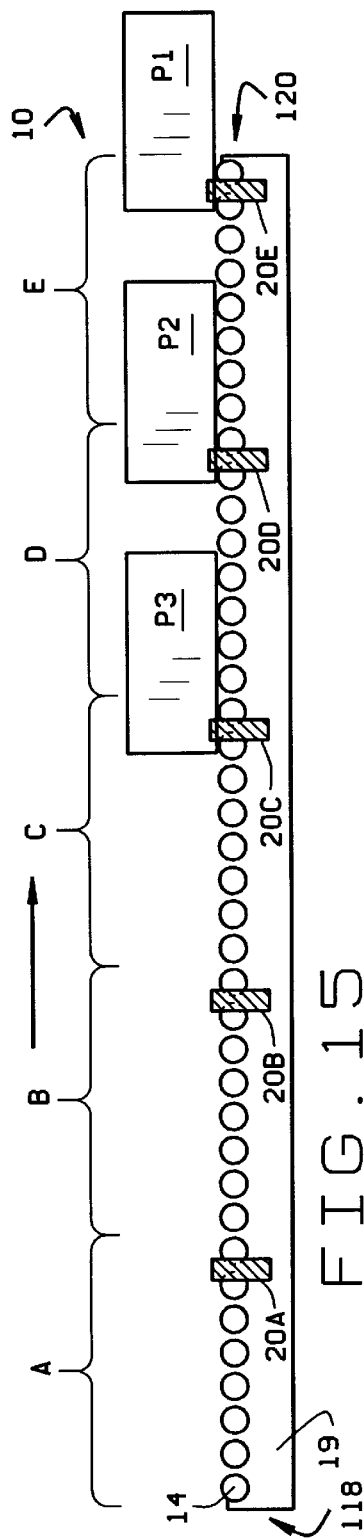
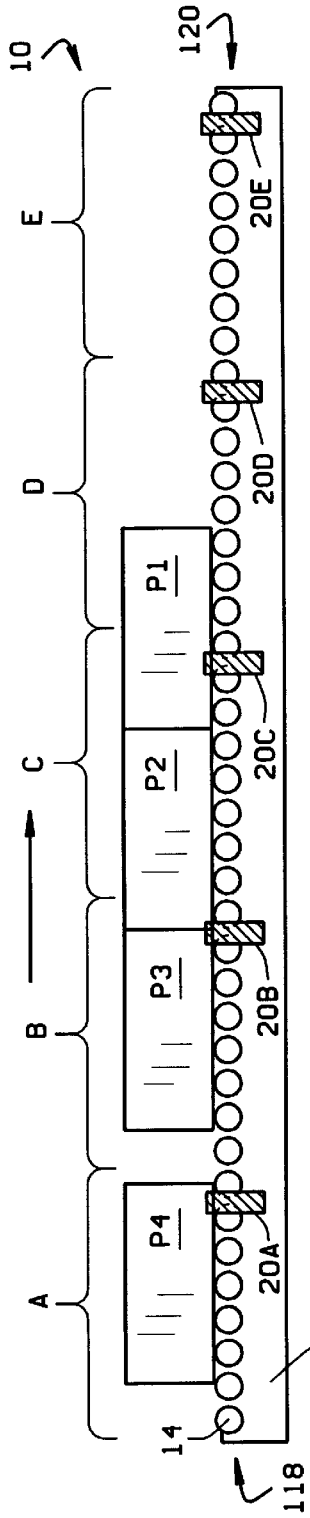
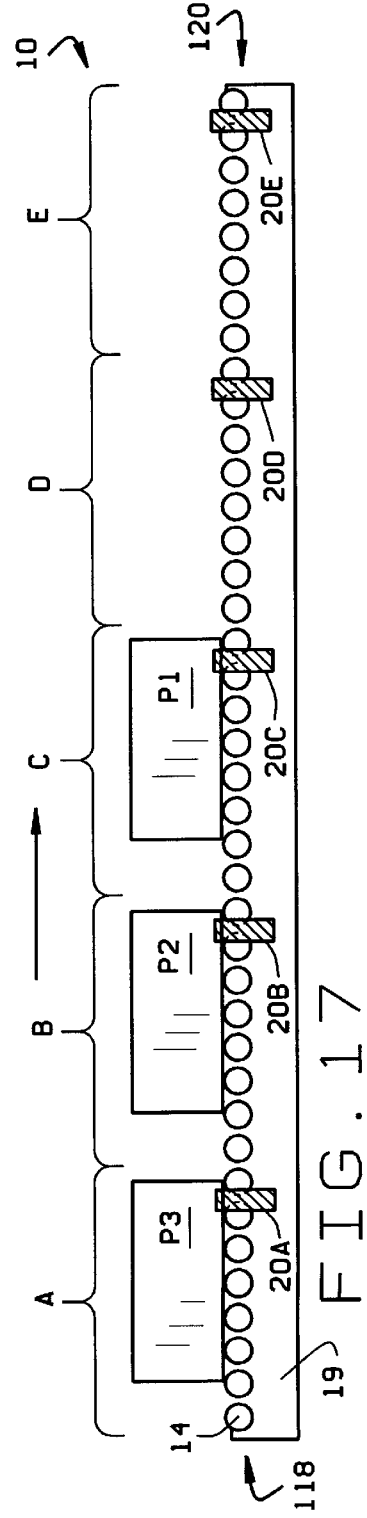

CONTROL SYSTEM AND MODULE FOR AN ACCUMULATION CONVEYOR

FIELD OF THE INVENTION

The present invention relates to accumulating conveyors and, more particularly, to a control system and associated modules for zero pressure accumulating conveyors.

BACKGROUND OF THE INVENTION

In the automated conveyor art, one type of automatic conveyor system is known as an accumulator conveyor. These types of conveyors are divided into a plurality of zones that extend from an inlet end to a discharge end. The zones are areas of the conveying surface where driving force to move the packages may be applied or removed independently of the other zones of the conveyor. These zones provide each package with its own stopping place. Packages or items are thus accumulated in successive zones for eventual discharge from the conveyor.

Zero pressure accumulation is a method of accumulating one or more items on a conveyor in a manner wherein there is no drive pressure or force trying to move the accumulated item before it is ready to be conveyed into another zone or discharged from the conveyor. Zero pressure accumulation conveyors differ from minimum pressure accumulation conveyors in that with minimum pressure conveyors there is always some drive pressure on the packages, even when the packages are being accumulated. Generally, each zone includes a sensing mechanism to determine whether a package is within its zone and associated logic to activate or deactivate the zone's driving force. Such sensors may be mechanical, or may be photoelectric.

However, while there are known electronic sensing systems such as that shown and described in U.S. Pat. No. 5,060,785 entitled Electrically-Powered Control System For Accumulating Conveyor issued to Garrity on Oct. 29, 1991, and U.S. Pat. No. 5,285,887 entitled Accumulating Conveyor And Control System issued to Hall on Feb. 15, 1994, they are deficient in many respects. Furthermore, these systems are not flexible in terms of options, wiring, or the like.

It is thus an object of the present invention to provide an improved control system for an accumulating conveyor.

It is another object of the present invention to provide a control system for an accumulating conveyor that provides photo-electric sensing at nearly the same cost as conventional mechanical/pneumatic sensing.

It is yet another object of the present invention to provide a control system for an accumulating conveyor which requires few parts and is simple to wire.

It is further an object of the present invention to provide a control system for an accumulating conveyor that has a higher degree of reliability than conventional mechanical/pneumatic control systems.

It is still further an object of the present invention to provide an accumulating conveyor control system that has several modes of operation, and offers greater flexibility than mechanical and/or pneumatic accumulation logic.

SUMMARY OF THE INVENTION

The present invention is a control device and/or system for a zero-pressure accumulating or accumulation conveyor that provides two modes of operation or control of the accumulation conveyor and thus the flow of items therealong, namely a singulation mode and a slug mode. The singulation mode separates the items while traveling down the conveyor as well as when items are released from the stopped conveyor zones to thereby create or maintain a zone length gap between the items. The slug mode does not separate the items while the items travel down the conveyor either during free travel of the conveyor or when items are released from the stopped conveyor zones.

The control device comprises a plurality of accumulation modules located along the length of the conveyor, preferably with one module located in each accumulating zone. Each accumulation module is generally linked to adjacent accumulation modules in a daisy-chain manner via a communications/power line. In the case of the first accumulation module of the infeed end accumulating zone relative to product flow (the infeed end accumulation module), and the last accumulation module of the discharge end accumulating zone (discharge end accumulation module), relative to product flow, the modules are linked to a single adjacent module, as there are no upstream or downstream modules. This allows intercommunication between all of the modules.

Each accumulation module is characterized by a sensor for detecting an item within its respective accumulating zone, input/output communications and control connections, and logic circuitry coupled to the sensor and input/output connections. Additionally, each module is in communication with an actuating device that controls the application of the driving force for the respective accumulating zone. The logic circuitry receives various input signals, when applicable, mainly indicative of 1) product detection within its respective accumulating zone of purview, 2) product detection within an immediately upstream accumulating zone, and 3) product detection within an immediately downstream accumulating zone. Other settings or enableable features (inputs) are factors in the evaluation process. These various signals are processed or evaluated by the logic circuitry of the module to determine whether to stop or continue application of the drive force to the accumulating zone of purview of that module, and what, if any, output signals to transmit. These evaluations are based on whether the control device is set to the singulation or the slug mode, as well as any other enabled features described hereinbelow.

In one form of the present invention, the sensor is a photoelectric type sensor and the logic circuitry is a microprocessor, however, other types would suffice. The photoelectric sensor provides a signal to the microprocessor when an item comes within the sensor zone (a product detect signal). This information is typically transmitted to the immediately upstream module and the immediately downstream module. The microprocessor also receives other input signals that are evaluated along with the sensor signal to determine whether to send a signal to apply or maintain the drive force to the respective zone, or to deactivate the drive force to the respective zone.

When the control device is set to the singulation mode, in general, items/packages separate as they proceed along the accumulation conveyor and when the are released therefrom. This mode creates a gap or distance between the items along the conveyor as items queue at the discharge end, and a zone-length thereafter upon release from the discharge end. When in the singulation mode, each accumulation module operates in the following manner. When a product is detected within the accumulation module's accumulating zone of purview by its sensor, a sensor signal indicative of product presence within the zone is received by the logic circuitry of the module. The logic circuitry evaluates the signal and causes a product detect signal to be transmitted to the immediately upstream accumulating module, where applicable, and to an immediately downstream accumulating module, where applicable. Thus each accumulating module communicates to its neighboring accumulating modules whether a product or package is within its respective accumulating zone.

If a module receives a sensor signal and a product detect signal from an immediately downstream module, thus indicating that the downstream accumulating zone has a package therein, the logic circuitry sends a no drive signal to the associated zone drive actuator to stop the drive force to the respective accumulating zone. If the module then detects the absence of a package within its accumulating zone, or receives a no product detect signal from the immediately downstream module, the logic circuitry transmits a drive signal to the associated zone drive actuator to cause the zone to drive.

When the control device is set to the slug mode, the modules operate in generally the same manner with the following exceptions. When a product is detected with the respective accumulating zone, the product detect signal, normally immediately transmitted to the immediately upstream module, is delayed for a predetermined time period controlled by the logic circuitry. If at any time during the predetermined time period the respective sensor does not detect a package the time delay is reset and no product detect signal is sent to the upstream module. This allows the free flow of packages along the conveyor. This is because a module must receive both a sensor signal indicative of product detection within its zone from its own sensor, and receive a product detect signal from the immediately downstream module in order to cease the drive force for the respective accumulating zone. The delay in signal transmission causes the product to move down the conveyor without singulation. This can occur when there is a gap between the packages or when there are in fact no other arriving packages.

The time delay described above provides a jam protection feature for the conveyor. As indicated, if the module detects a package for more than the predetermined time period, generally indicating a jam within the respective zone, the product detect signal is transmitted to the upstream module, while the respective zone continues to drive. This allows the upstream modules to accumulate packages until the jam has been removed. The jam protection feature may be disabled by setting a jam enable switch on the dipswitch to the DISABLE or OFF position. This effectively sets the predetermined time period to infinity and no product detect signal will be transmitted to the upstream module regardless of whether a package is detected for more than the predetermined time period.

The last module of the control device which is located at the last accumulating zone or discharge end zone includes a blanking plug that fits over the control connection inputs. The blanking plug generally protects the inputs from short circuit and controls the user-selectable modes of singulation or slug. The blanking plug includes two (2) terminals that provide input connections for selecting slug mode only and singulation/slug mode. The default setting is the singulation mode, but is overridden by the connections made on the blanking plug. By connecting a jumper between the terminals of the blanking plug, the control device is set to operate in the slug mode only. By connecting a wire pair to the terminals with the other end coupled to a dry contact switch, relay or programmable switch device, the control device is set to operate in both the singulation mode or the slug mode. When the switch is in the open position, the control device operates in the singulation mode. When the switch is closed, the control device operates in the slug mode.

It is also possible to connect two or more conveyors together in an end-to-end relationship. An optional conveyor-to-conveyor connector is required to link the last accumulation module of the upstream conveyor to the first accumulation module of the connecting conveyor.

According to another aspect of the present invention, each accumulation module also has input terminals to accept a zone stop input from an outside source, such as a switch or programmable controller. The zone stop is in addition to the user-settable modes of operation via the blanking plug. Once set, the zone stop input tells the logic circuitry of the particular module to stop the drive force for the respective accumulating zone once an item is detected within the zone. The zone stop may be used at the discharge end to control the discharge of items from the accumulating conveyor, or to stop items somewhere along the conveyor path.

In this mode, the logic circuitry treats the zone stop signal as a product detect signal coming from the immediately downstream module indicating that a product is present in the immediately downstream accumulating zone. When a module receives a zone stop signal and simultaneously receives a product detect signal from its own sensor, the logic circuitry does not send a product detect signal to the immediately downstream module, as normally would occur, in order that the downstream module may "go to sleep."

In accordance with an aspect of the present invention, the logic circuitry of each module is set to send a no drive signal to its respective actuating device to deactivate the drive force to the respective zone, thereby allowing the zone to go to sleep, when certain input signals have not been received by the logic circuitry within a predetermined time period. The sleep feature may also be manually disabled or enabled by a SLEEP DISABLE/SLEEP ENABLE (or OFF/ON) switch on a dipswitch located on the module. Generally, the first or infeed accumulation module is set to "SLEEP DISABLE" or "OFF." The predetermined time period is, of course, arbitrarily defined, and is switchable between two time lengths via another switch on the dipswitch.

When a module does not detect an item within its respective accumulating zone, and thus the sensor does not send a product detect signal to the logic circuitry, and a product detect signal is not received from the immediately upstream module within the predetermined time period, the no drive signal is transmitted. Once a product detect signal is received by the logic circuitry either from the immediately upstream module or from its respective sensor, a drive signal is transmitted to start the zone. If however, during the predetermined time period, one of the two product detect signals are received, the sleep clock is reset.

In order to provide power to the modules, a special power plug is connected to the control connections of one of the modules such that power may be supplied thereto. Up to fifty (50) modules may be powered from a single power plug. The communication cable from the downstream module is connected to the power plug.

It should be understood that the term signal may be a positive act such as an encoded signal that communicates a desired on or off state, or may be the presence or absence of a signal in the case of strict digital signal employing an ON/OFF (0/1) protocol. The type of signal is arbitrary depending on the overall design of the system as this does not effect the concept of the present invention.

BRIEF DESCRIPTION OF THE DRAWINGS

So that the manner in which the above-recited features, advantages, and objects of the present invention are attained and can be understood in detail, a more particular description of the invention, briefly summarized above, may be had by reference to the embodiment thereof which is illustrated in the appended drawings.

It is noted, however, that the appended drawings illustrate only a typical embodiment of this invention and is therefore not to be considered limiting of its scope, for the invention may admit to other equally effective embodiments. Reference the appended drawings, wherein:

FIG. 5 is an enlarged partial side view of the conveyor of FIG. 1 depicting a multiplicity of control modules located along a siderail of the conveyor and their interconnection;

FIG. 6 is an enlarged front view of a control module and associated pneumatic valve, wherein the control module is configured to receive power for the control system;

FIG. 7 is an enlarged view of the four switch DIPswitches and terminal block of the control module;

FIG. 8A is an enlarged front view of the blanking plug wired for slug mode only;

FIG. 8B is an enlarged front view of the blanking plug wired for either singulation or slug mode;

FIG. 9 is a diagrammatic representation of an empty accumulating conveyor with five zones A–E;

FIG. 10 is a diagrammatic representation of the accumulating conveyor of FIG. 9 with a package P1 at the infeed end, the control device set to either the singulation or slug mode;

FIG. 11 is a diagrammatic representation of the accumulating conveyor or FIG. 9 with the package P1 having travelled to the discharge end, the control device set to either the singulation or slug mode;

FIG. 12 is a diagrammatic representation of the accumulating conveyor of FIG. 9 wherein package P1 has been held at the discharge end and packages P2 and P3 have entered and traveled down the conveyor, again the control device being set to either the singulation or slug mode;

FIG. 13 is a diagrammatic representation of the accumulating conveyor of FIG. 12 wherein package P1 is being released with the control device set to the singulation mode;

FIG. 14 is a diagrammatic representation of the accumulating conveyor of FIG. 13 releasing package P2;

FIG. 15 is a diagrammatic representation of the accumulating conveyor of FIG. 12 wherein the packages are being released while the control device is in the slug mode;

FIG. 16 is a diagrammatic representation of the accumulating conveyor with package P1jammed and the other packages P2, P3, P4stacking up therebehind with the control device set to slug mode; and FIG. 17 is a diagrammatic representation of the accumulating conveyor illustrating the use of a stop zone in accumulating zone C.

DETAILED DESCRIPTION

Figure 1:
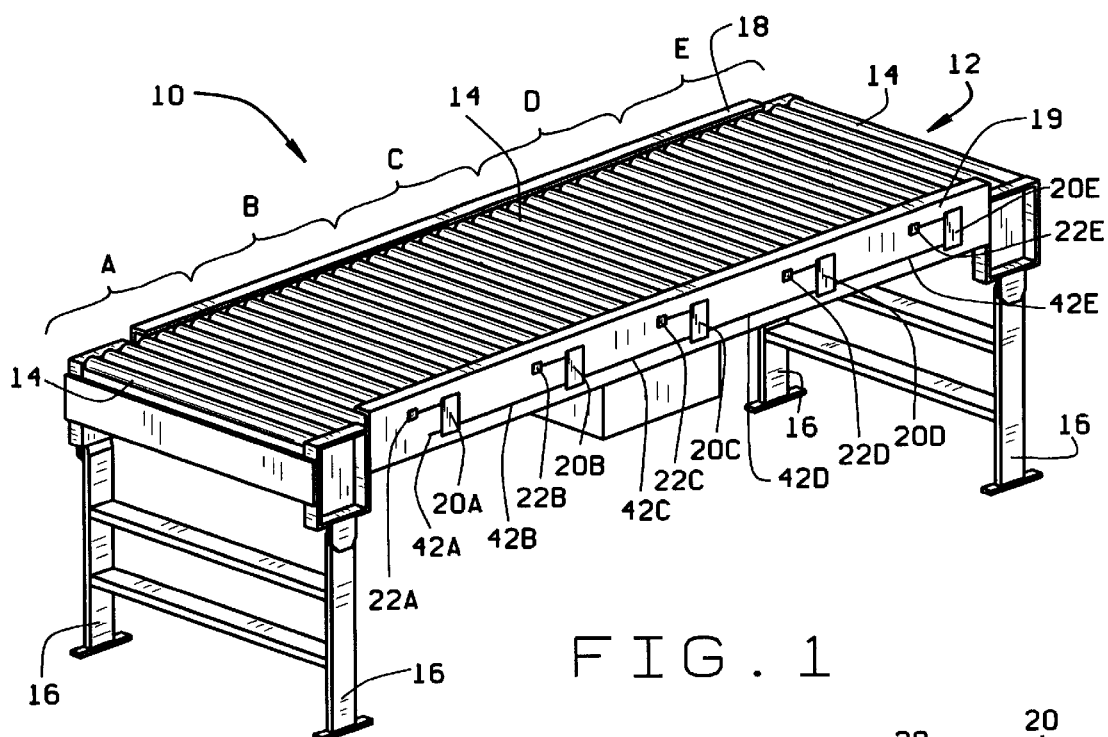
FIG. 1 is a front perspective view of a typical accumulating conveyor installed with the present control system.

Referring now to FIG. 1 there is shown a zero-pressure accumulation conveyor generally designated 10 whose upper or conveying surface 12 is defined, in this case, by a plurality of rollers 14, although other types of conveying surfaces, such as belts, slats, or the like may be used. The conveyor 10 is divided into a plurality of accumulating zones identified by the letters A, B, C, D, and E, such that there are five (5) accumulating zones. Of course, there could be any number of accumulating zones depending upon the overall length of the particular conveyor or other conveyor design considerations, the number of shown accumulating zones five (5), being arbitrary.

The conveyor 10 has a direction of product flow over the conveying surface 12, which is arbitrarily chosen as from accumulating zone A towards accumulating zone E. Therefore, accumulating zone A is the first accumulating zone, generally known as the infeed end accumulating zone, while accumulating zone E is the last accumulating zone, generally known as the discharge end accumulating zone. As with typical zero-pressure accumulating conveyors, each accumulating zone is independently engageable and disengageable with a drive force in order to convey packages or items through the accumulating zone or to stop the packages or items within the accumulating zone. Each accumulating zone may also be separately driven with the drive force also being engageable and disengageable. In either case, the drive mechanism is selectively applied to the accumulating zones according to the receipt of a drive signal to drive the rollers associated therewith, while the drive mechanism is disengaged from the accumulating zone to disengage the rollers associated therewith according to the receipt of a no drive signal as described hereinbelow. This is usually accomplished via an actuator in communication with the drive force.

With reference still to FIG. 1, the rollers are rotatably supported between a first siderail 18 and a second siderail 19 which are in turn supported by legs 16. Other details of the conveyor structure are not described herein as they are well known in the conveyor industry. Disposed conveniently on one siderail 19 are a plurality of accumulation modules 20, designated 20A, 20B, 20C, 20D, and 20E, corresponding to the accumulating zones A–E to which each module 20 is associated. In communication with each module A–E is a drive force actuator 22A–E each of which is able to selectively apply the drive force to each zone or to disengage the drive force to each zone depending on the received signal. Additionally, each module is in communication with its neighboring or adjacent module, both in the upstream direction and the downstream direction relative to conveyor flow, where possible, through communications cables 42A–E. Accumulating zone A is of course only in communication with its adjacent downstream module 20B, while accumulating zone E is of course only in communication with its adjacent upstream module 20D as would any first and last module. Also, each module 20A–E is preferably located proximate the end of each respective zone A–E, relative to conveyor flow. The aggregation of accumulation modules 20A–E constitute an accumulation control device or system that works in conjunction with the drive/no drive actuators and associated couplings to control the flow of packages along the conveyor.

Figure 2:
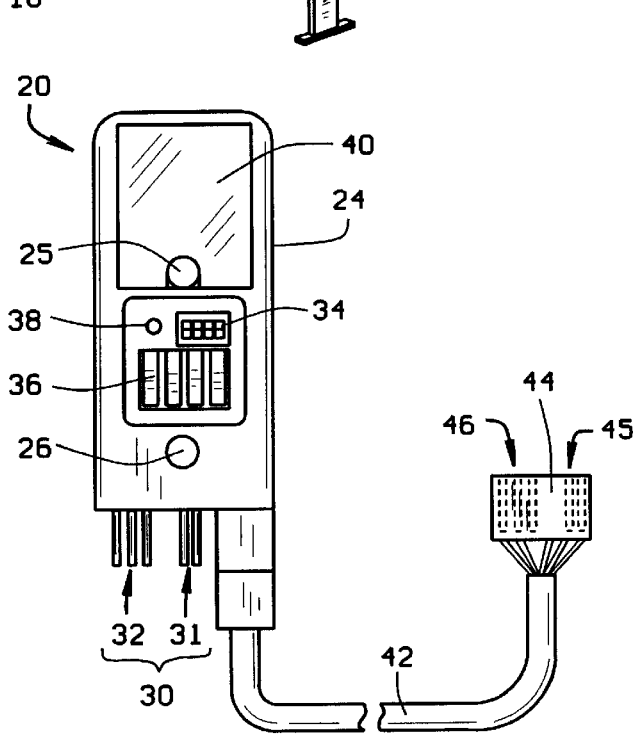
FIG. 2 is an enlarged front view of a control module.
Figure 3:
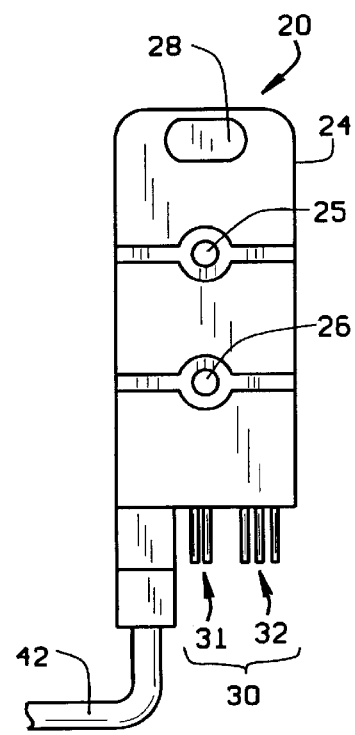
FIG. 3 is an enlarged rear view of the control module.

Referring to FIGS. 2 and 3, an accumulation module 20 is shown. It should be understood that each accumulation module depicted in the various Figures is the same and thus FIGS. 2 and 3, and the following description are applicable to all of the modules 20A–E. Each module 20 includes a housing or casing 24 that encloses electrical logic circuitry that receives various input signals and transmits various output signals based on internal evaluations as flow diagrammed via a state diagram (FIG. 4) and described hereinbelow with reference thereto. The logic circuitry may include a microprocessor and other necessary components, or may be another type of logic structure that will perform the functions diagrammed in FIG. 4 and described herein. The casing 24 has two bores 25, 26 extending therethrough for mounting the module 20 to the siderail or other structure via screws or the like. A sensor 28 is disposed on one side, the side facing the conveying surface 12, the sensor 28 in communication with the logic circuitry. The sensor 28 is used to determine the presence or absence of an item or package within the respective accumulating zone and to send a signal to its respective logic circuitry indicating the same. The sensor may be a photoelectric sensor, a proximity sensor, an ultrasonic sensor, or any other type of sensor that is capable of detecting the presence or absence of an item within the respective accumulating zone and providing a signal indicative of the same to the logic circuitry.

The module 20 also has various inputs and outputs generally termed control connections for receiving input signals and sending output signals, and coupling various devices to the module 20. Signals to and from adjacent modules (communications) and power for each module is made via control connections 30 including power connections 31 and signal input/output connections 32. Integral to the module 20 is a linking communications/power cable or line 42, typically between 3–6' in length, that terminates in a plug 44. The plug 44 is keyed to match the control connections 30, having a power receptacle 45 and a communications receptacle 46. By connecting the plug 44 to the control connections of the upstream module and so on in a daisy-chain manner, each module is in communication with its neighboring modules.

Additionally, the module 20 has a four (4) switch ON/OFF type dipswitch 34, a four (4) pronged terminal block 36, an indicator LED 38, and a logo/information area 40. The switches and switch settings for the dipswitch 34, as well as the connections to the terminal block 36, will be described hereinbelow with reference to the other Figures but form a part of the control connections. Different modes of operation of the module and/or various time lengths associated with various settings/options may be configured via the switches. The LED 38 provides a visual status and mode indication coded in blinks of the light to allow perception by a remote viewer.

Referring now to FIG. 7, there is depicted an enlarged view of the front face of the module casing 24 showing the LED 38, the dipswitch 34, and the terminal block 36. As indicated above, the LED 38 visually provides a real time indicator of the status and mode of the particular module according to a particular code sequence. The particular code sequence is arbitrary. As indicated above, the dipswitch 34 has four (4) two-position switches that are used to enable or disable several features or options of the present invention and set several parameters therefor. It should be understood that the switch choice for the particular function or feature is arbitrary. Switch 62 is the solenoid output switch and is used to select whether the module's output to the actuator (or solenoid as the case may be) that controls the application of the drive force to the accumulating zone, is an "ON TO STOP" signal, or an "OFF TO STOP" signal. The switch 63 is the jam enable switch and is used to enable or disable the jam protection feature for the particular module. This feature is available only in the slug mode and helps prevent product pile-up and/or damage if a package should become jammed on the conveyor. The default setting is in the ENABLE position. Switch 64 is the sleep feature switch. It is used to enable or disable the sleep feature for the particular module. When the sleep feature is enabled, the logic circuitry of the particular module will stop the zone rollers from turning if no packages are detected for a set time period through disengagement of the drive force. The zone wakes up when a package is detected in the adjacent upstream zone or by the current zone. The default setting is ENABLE on all modules except for the module on the infeed accumulating zone which is set to DISABLE. The last of the four switches, switch 65 is the sleep time period selection switch. The switch 65 is used to select the time delay period used by the sleep feature before the sleep mode is activated by the logic circuitry. Again, the time period is arbitrary, but has been selected as five (5) or fifteen (15) seconds. A module must not see a package for the time delay period for the module to enter the sleep mode.

The terminal block 36 has four (4) terminals that clamp wire using a simple lever action and is used to couple devices to the module. The wires are initially stripped before insertion into the terminal. Terminals 66, 67 are used to couple the actuator or solenoid that controls the application of the drive force to the particular accumulating zone to the module for control thereof. Terminals 68, 69 are used to accept a zone stop signal from a "dry contact" type switch, PLC (Programmable Logic Controller), etc., in order to allow any zone to become a stop zone through use of the connected switch. Closing the switch will place the module into the accumulate mode such that the next package to activate the module (detected by the sensor) will be stopped within the zone and held until the switch is open. The zone stop feature is logically used by the discharge module to control the release of packages from the discharge zone. By coupling a switch to the terminals 68, 69, any zone may become a stop zone.

Referring to FIG. 5 there is depicted an enlarged, partial view of the siderail 19 of the present conveyor 10 with the control device installed thereon. As indicated, there is one module 20 for each accumulating zone A–E, and thus the modules associated with the particular zones are labeled 20A–20E, with the respective components likewise distinguished by the A–E designation. Initially, the modules 20A–E are mounted on the siderail via the mounting bores 25,26, such that the sensors 28A–E may "view" the other siderail 18. Disposed on the other siderail 18 is a reflector device (not shown) for sending the sensor beam back to the sensor pickup. Generally, the sensor 28 includes both a transmitter and a receiver, either as an integral whole or as separate components. Each module is coupled to its immediately adjacent upstream module via the link 48 by inserting the plug 44 of its link 48 into the control connection 30 of the adjacent upstream module. An actuator, or solenoid, 22 is associated with each accumulating zone A–E as are modules 20. Each module 20A–E is in communication with a respective actuator 22A–E by respective lines 48A–E which are coupled to the respective terminals 66A–E, 67A–E of the respective terminal blocks 36A–E. The actuators 22A–E are in communication via respective lines 50A–E to engage or disengage the drive force (not shown) for the particular accumulating zone A–E. In this depiction, the actuators 22A–E are pneumatic and thus respective air couplings 52A–E are coupled to an air infeed line 124. The particulars of air actuated solenoids (actuators) and associated devices to engage and disengage the drive force are well known in the art. Also, other types of systems, such as mechanical or a pneumatic/mechanical combination may be utilized in accordance with the principles of the present invention.

It should be noticed that the infeed zone A module 20A is not coupled to an upstream module because there is none. However, the module 20A is in communication with module 20B. It should also be noticed that the discharge zone E module 20E has an optional blanking plug 54 inserted over the control connections rather than a plug 44 as there is no downstream module. The blanking plug help to prevent short circuits between the control connections, and provides mode selection for the entire control device. The default mode is the singulation mode, but if the user desires to use the slug mode or switch between the singulation and slug mode, the blanking plug 54 needs to be used. With additional reference to FIGS. 8A, 8B an enlarged blanking plug is depicted. The blanking plug 54 has two (2) terminals 55,56, to which stripped wires may be attached. In FIG. 8A, a jumper 58 is used to tie the terminals 55,56 together. This results in the control device being set in the slug mode only. In FIG. 8B, a twisted pair wire 60 is coupled at one end to the terminals 55,56 and to the other end to any type of dry contact switch, relay, PLC, or the like 126. In this configuration, the mode of operation is selectable between the singulation mode and the slug mode depending on the state of the switch. When the switch 126 is open, the conveyor 10 will be in the singulation mode. When the switch 126 is closed, the conveyor 10 will be in the slug mode. FIG. 5 also shows a switch 128 (that could be a relay, PLC or the like) coupled to the terminal block 36E (in particular terminals 68E and 69E) via wire 129 to control the discharge of the products through the stop zone connections. Thus, when the switch 128 is closed, and a package is detected within the module's accumulating zone purview, the zone will stop until the package is no longer detected, or the zone stop switch is released. A reference should be made to the below state diagram and description of operation for the modules.

Referring now to FIG. 6, there is depicted an accumulation module 20 having a power plug 122 installed on the control connections. A power plug 122 is necessary in order to couple a power supply (not shown) to operate the modules. A power line (not shown) is connected to the "+" and "−" terminals while the adjacent downstream module plug 44 is attached to the power plug 122. A single power source can power up to approximately fifty (50) modules, twenty-five (25) on either side of the powered module.

Figure 4:
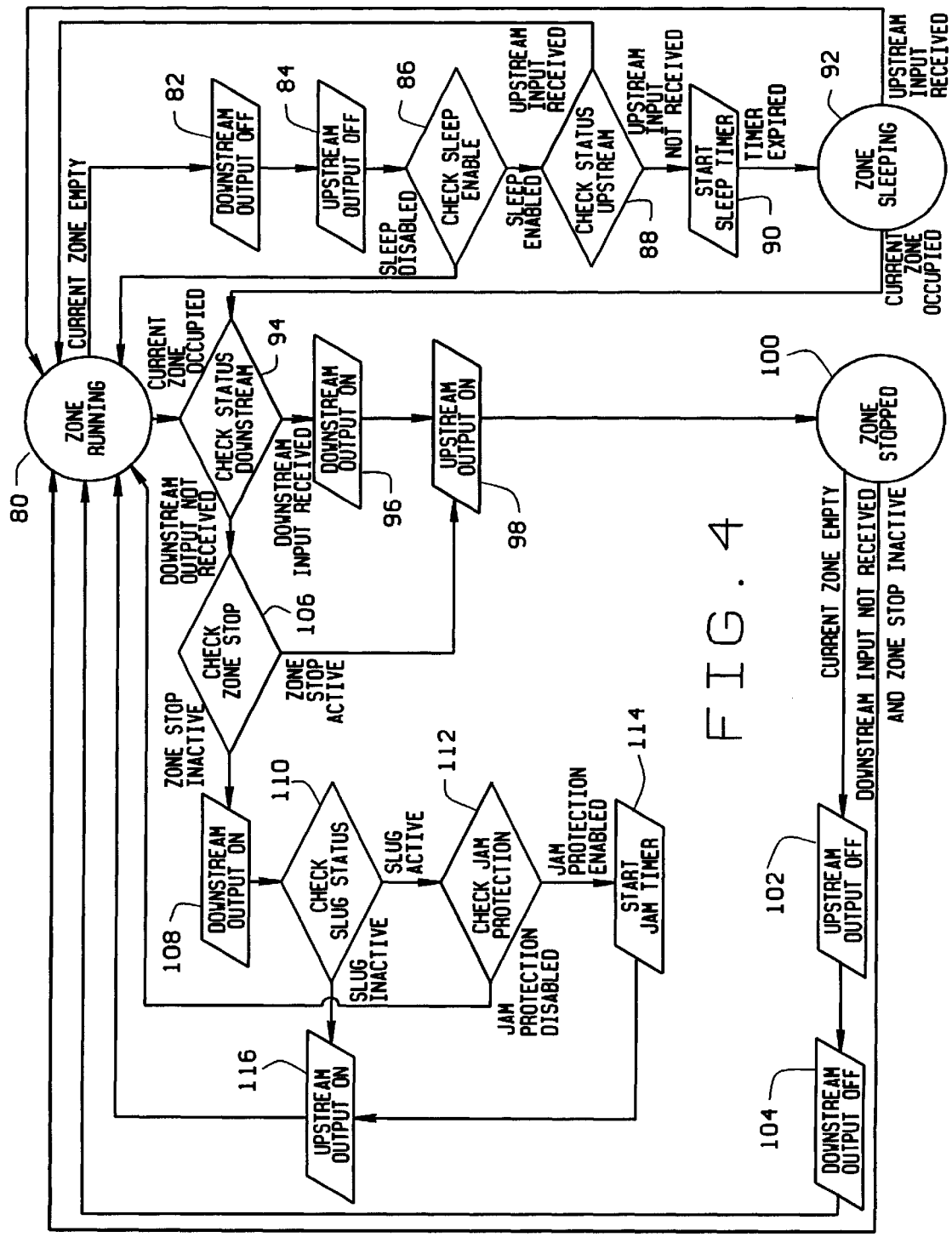
FIG. 4 is a state diagram of the control module logic.

The logic circuitry flow or evaluation of the various inputs and the required outputs of each module 20 is depicted as a state diagram in FIG. 4 and attention is now directed thereto. Any type of logic circuitry that will accomplish the state diagram may be utilized by each module. Initially, it should be understood that 1) there is one module for each accumulating zone and thus, any reference to a module and "its" accumulating zone is assumed to mean the accumulating zone under the purview of the referenced module; and 2) any reference to "a signal" or "no signal" is any form of communication that accomplishes the intended purpose. Essentially, these are three (3) STATES, the ZONE RUNNING STATE 80, the ZONE SLEEPING STATE 92, and the ZONE STOPPED STATE 100. Each "step" along the way is a logical question whose answer must be "true" to proceed therealong to the next STATE in accordance with the general principles of STATE diagrams. The main or normal state of each module is the ZONE RUNNING STATE 80. When power is applied to the conveyor and the control device, each module transmits a drive signal to its respective actuator, which in turn enables the drive force for the respective accumulating zone, and thus ZONE RUNNING STATE 80. Next, the logic circuitry checks its sensor to determine whether a package or item has been detected within the respective accumulating zone. Such checking by the logic circuitry may take the form of polling, of received signal(s) from the sensor, or of non receipt of signal(s) from the sensor.

The next few paragraphs describe the sleep mode feature of the present invention. If no packages are detected by the sensor and thus the current accumulating zone is empty, the CURRENT ZONE EMPTY flow path is correct, the logic circuitry flow proceeds along the flow path to the query DOWNSTREAM OUTPUT OFF 82. In response to the CURRENT ZONE EMPTY, at the DOWNSTREAM OUTPUT OFF 82, the logic circuitry transmits a no product detect signal (or e.g., stops sending a product detect signal) to the downstream accumulating module. Next, the logic circuitry proceeds to the UPSTREAM OUTPUT OFF 84 and a no product detect signal is transmitted to the upstream accumulating module.

Next, the logic circuitry proceeds to the CHECK SLEEP ENABLE 86 where the position of the dipswitch switch 64 is checked to see if the SLEEP MODE function is enabled or disabled. If the SLEEP MODE is enabled, the logic circuitry proceeds to the CHECK STATUS UPSTREAM 88 to see if a package has been detected within the immediately upstream accumulating zone. If a package has been detected in the immediately upstream accumulating zone, then the immediately upstream accumulation module will accordingly transmit a product detect signal to its immediately downstream accumulation module, and an UPSTREAM INPUT RECEIVED answer maintains the accumulation zone running. If however, an UPSTREAM INPUT NOT RECEIVED is the answer to the CHECK STATUS UPSTREAM 88, the logic circuitry proceeds to the START SLEEP TIMER 90 and the sleep timer starts. The timer period is a predetermined time length, that is arbitrarily chosen as five (5) seconds or fifteen (15) seconds settable via dipswitch 65. If a product detect signal is received from the immediately upstream module, then the logic circuitry transmits a drive signal to the actuator to start the zone running, STATE 80. If however, the TIMER EXPIRES, the module transmits a no drive signal and the zone enters the ZONE SLEEPING STATE 92 whereupon the drive force is disengaged from the accumulating zone and the zone sleeps. Again, the logic circuitry checks to determine whether a product detect signal has been received from the immediately upstream module and, if it has, the zone is set to running by the transmission of a drive signal to the respective actuator to engage the drive force. The accumulating zone remains in the sleep mode until either 1) a product detect signal is received from the upstream accumulation module (indicating a package within the immediately upstream accumulating zone) or 2) the current accumulating zone becomes occupied by a package. If the latter is the case, the logic circuitry continues its logic flow to the CHECK STATUS DOWNSTREAM 94 which will be described in conjunction with the ZONE RUNNING STATE 80. During the above described flow at the CHECK SLEEP ENABLE 86 and, if the sleep feature has been disabled through dipswitch 64, the flow brings the logic circuitry back to the ZONE RUNNING STATE 80.

While the module is in the ZONE RUNNING STATE 80, if the respective sensor is detecting a package within its accumulating zone, then the current zone is occupied and the logic circuitry proceeds to the CHECK STATUS DOWNSTREAM 94. If a product detect signal is being received from the immediately downstream module then the downstream accumulating zone is occupied. At this point, the current module is both detecting a package within its zone and receiving a product detect signal from the immediately downstream module. The current module then transmits a product detect signal to the downstream module, the DOWNSTREAM OUTPUT ON 96 and transmits a product detect signal to the upstream module, the UPSTREAM OUTPUT ON 98. Thereafter, the accumulating zone is stopped, ZONE STOPPED STATE 100, by the logic circuitry transmitting a no drive signal to the respective actuator to disable the drive force to the particular accumulating zone. At this point, two 2 events may occur. First, if the zone stop is inactive, and if at this point a product detect signal from the adjacent downstream module is not received by the logic circuitry of the current module, the module returns to the ZONE RUNNING STATE 80. Second, if the current zone becomes empty, the logic circuitry ceases its product detect signal to the adjacent upstream module, the UPSTREAM OUTPUT OFF 102, ceases its product detect signal to the adjacent downstream module, the DOWNSTREAM OUTPUT OFF 104, and proceeds to the ZONE RUNNING STATE 80.

The above paragraph detailed the module logic circuitry flow path with respect to a product being detected within the current accumulating zone and the receipt of a product detect signal from the adjacent downstream module. Now, the module logic circuitry flow path will be described starting at the CHECK STATUS DOWNSTREAM 94. If the current module is not receiving a product detect signal from the adjacent downstream module, indicating that the adjacent downstream zone is not occupied by a package, the flow proceeds to the CHECK ZONE STOP 106. If the zone stop feature is enabled (active), then the logic circuitry transmits a product detect signal to the adjacent upstream module, the UPSTREAM OUTPUT ON 98, and the program flows as described above. If however, the zone stop is disabled (inactive) the program flow proceeds to the DOWNSTREAM OUTPUT ON 108 where the logic circuitry transmits a product detect signal to the adjacent downstream module. Then the logic circuitry checks the mode of operation of the module by checking to see if the slug mode has been enabled, the CHECK SLUG STATUS 110, since the singulation mode is the default mode. If the slug mode has not been chosen, and thus inactive, the module transmits a product detect signal to the adjacent upstream module, the UPSTREAM OUTPUT ON 116, and thereafter returns to the ZONE RUNNING STATE 80. This means that a product has been detected within the current accumulating zone, the singulation mode has been chosen, but since no package has been detected in the adjacent downstream accumulating zone, the package will proceed down the conveyor.

If however, from the CHECK SLUG STATUS 110, the module is set to the slug mode, the slug status is active and the logic circuitry proceeds to the CHECK JAM PROTECTION 112 to ascertain whether the jam protection feature has been enabled or disabled. If the jam protection feature has been disabled, the logic circuitry proceeds to the ZONE RUNNING STATE 80. If the jam protection feature is enabled or active, the logic circuitry proceeds to the START JAM TIMER 114, whereupon if the timer expires, the logic circuitry transmits a product detect signal to the adjacent upstream module, the UPSTREAM OUTPUT ON 116. This is because if a module detects the presence of a package within its zone for more than the timer period, it is assumed that the package is jammed on the conveyor. By sending a product detect signal to the adjacent upstream module, the upstream zones begin to accumulate packages until the jam is cleared.

It is evident that all modules cooperate to handle packages by receiving and sending various signals to each other and evaluating the same in accordance with the STATE diagram.

Operation

With reference now to FIGS. 9–17, the overall operation of the present accumulating conveyor control device will be described relative to packages entering the accumulating conveyor, being carried down the conveyor, and being discharged from the conveyor, when the control device is in the singulation mode, the slug mode, and the various features associated therewith. It should initially be understood that, 1) in FIGS. 9–12, the sequence of events are applicable to both the singulation mode and the slug mode; 2) in FIGS. 13 and 14, the sequence of events apply to the singulation mode only; 3) in FIGS. 15 and 16, the sequence of events are applicable to the slug mode only; and 4) in FIG. 17, the sequence of events applies to both the singulation and slug modes.

FIG. 9 depicts an empty accumulating conveyor 10 having five (5) zones A–E with zone A at the infeed end 118 and zone E at the discharge end 120. The conveyor has no packages thereon and is thus empty. Zones B–E are sleeping (not running) assuming the sleep mode is enabled, indicating that there has not been any package for the set time period. Zone A however, is set to sleep mode disabled such that zone A is running in order to convey a package to the discharge zone E and begin the "waking up" process. Zone E has its zone stop setting to active to cause the first carton to reach zone E to be stopped therein. In FIG. 10, a package P1 has entered zone A. Upon detection of the package P1 in zone A by the module 20A, a product detect signal is sent to the adjacent downstream module 20B. Upon receipt of a product detect signal from the adjacent upstream module 20A, module 20B transmits a drive signal to its respective actuator to "wake up" the zone. Thus, the package P1 is transported from zone A into zone B.

Referring to FIG. 11, the package P1 has been transported all the way to zone E, the discharge zone. Each adjacent module from module 20B, therefore modules 20C and 20D have run through the same sequence as described between modules 20A and 20B. However, when the package P1 reaches zone E, module 20E being set to zone stop enable, transmits a no drive signal to its respective actuator to stop the drive force in zone E. The module 20E simultaneously sends a product detect signal to the adjacent upstream module 20D. Zones D and C are still in the zone running state as their sleep timers will not yet have expired, while zone B is in the sleep mode as its sleep timer will have expired. We will assume that it is not desired to discharge package P1 from the conveyor 10 at the present. FIG. 12 depicts the situation where two more packages P2, P3 have entered the conveyor 10. Package P2 travels down the conveyor as described above until it detected by module 20D. Since module 20D has already received a product detect signal from the adjacent downstream module 20E, the detection of the package P2 within its zone, zone D, will cause the module to transmit a no drive signal to stop its zone, zone D. Module 20D also sends a product detect signal to its adjacent upstream module 20C, and to its adjacent downstream module 20E. As package P3 travels down the conveyor 10 it is detected by module 20C. Since module 20C has already received a product detect signal from the adjacent downstream module 20D, the module 20C outputs a no drive signal to stop the zone, zone C. Module 20C also transmits a product detect signal to the adjacent upstream module 20B and to the adjacent downstream module 20D. Also, since no packages have entered the conveyor 10, zone B has gone to sleep.

Again, the sequence of events described above with reference to FIGS. 9–12 are applicable to both the singulation mode and the slug mode. If the zone E module 20E were not set to zone stop, the products would be discharged from the conveyor regardless of the mode, unless the products were too close together while in the singulation mode. In the singulation mode, the packages would momentarily stop within the zones to provide the proper spacing.

Referring to FIGS. 13 and 14, the discharge of packages from the conveyor will be described when the control device is set to the singulation mode. When it is desired to discharge the packages from the conveyor, the zone stop input to module 20E is disabled or set to inactive. This will cause the module 20E to send a drive signal to start the respective zone running since the module 20E will not be receiving a product detect signal from an adjacent downstream module in addition to the current product detect signal from its own sensor, because there is no downstream module. As the package travels along zone E, the module 20E will continue to send a product detect signal to the adjacent upstream module 20D until the entire package has cleared the module 20E. Since module 20D is still receiving its own product detect signal and a downstream product detect signal, zone D remain stopped. This produces a gap between the packages approximately equal in length to the length of the zones, hence the term singulation. Once however, the package P1 has cleared the module 20E, the module 20E stops sending a product detect signal to the adjacent upstream module 20D causing the module 20D to send a drive signal to start the drive force for its zone, zone D. The package P2 continues to advance through zone D while zone C is still stopped since the zone D module 20D is still detecting a package. As the package P2 clears the module 20D, the product detect signal to the adjacent upstream module 20C ceases allowing the package P3 to begin its travel down the conveyor. The package P2 is discharged from the conveyor as explained above with reference to package P1, likewise with package P3.

FIG. 15 depicts the release of packages after accumulation in FIG. 12 when the conveyor is in the slug mode. The zone stop input to module 20E has been set to inactive causing module 20E to change zone E to a running state, in turn causing zone E to begin discharge of package P1. In contrast to the singulation sequence, module 20E will not immediately send a product detect signal to the adjacent upstream module 20D even though a package P1 is still being detected by the module 20E, but instead starts the jam timer. If package P1 is still being detected by module 20E after the jam timer has expired, the product detect signal is then sent to the adjacent upstream module 20D. Typically, the package P1 will have been discharged from the conveyor and thus will have traveled past the module 20E before the expiration of the jam timer, and thus the product detect signal is never sent to the adjacent upstream module 20D. At this point, since module 20D is no longer receiving a product detect signal from the adjacent downstream module 20E, zone D becomes active through the module 20D outputting a drive signal, thus advancing package P2. This process continues upstream until the packages have been discharged from the conveyor. This sequence of events happens so quickly that for practical purposes the zones change from the stopped state to the running state simultaneously.

In FIG. 16, the jam protection feature is demonstrated as it applies to the slug mode. Package P1 is shown as being jammed between zones C and D, and is being detected by module 20C. Upon detection of package P1, module 20C begins the jam timer (in addition to sending a product detect signal to the adjacent downstream module 20D). Since the package P1 is jammed, the timer will expire (time out) thus, causing the module 20C to send a product detect signal to the adjacent upstream module 20B. While the jam timer for module 20C was operating, packages P2 and P3 were driven into the jammed package P1. When module 20B receives the product detect signal from the adjacent downstream module 20C, it will generate a no drive signal to stop the zone, zone B. Module 20B which is detecting package P3 also sends a product detect signal to the adjacent upstream module 20A, bypassing the jam timer in module 20B. When the package P4 then is detected by the module 20A, a no drive signal is generated by the module 20A to stop the zone A from running. Once the jammed package P1 is dislodged or removed, the conveyor returns to the normal slug mode state.

Again, with the jam protection enabled while in the slug mode, if a package becomes jammed at any zone for a predetermined time period (e.g. 6 seconds) or longer, packages on the upstream side of the jammed package will stop in sequence until the jammed package is dislodged or removed. The zone containing the jammed package will continue to drive, in many cases dislodging the jammed package without outside help. The zones will return to normal operating mode once the jam is cleared.

Finally, with reference to FIG. 17, the use of a stop zone wired in the middle of the conveyor is illustrated. In this instance a switch has been connected to the appropriate terminals of the terminal block of module 20C in order to make module 20C a zone stop. By setting the zone stop input of module 20C to active, module 20C is set up to stop the package P1 when it enters zone C. Packages P2 and P3 in stop in zones B and A in accordance with the sequence described with reference to FIG. 12.

While the foregoing is directed to the preferred embodiment of the present invention, other and further embodiments of the invention may be devised without departing from the basic scope thereof, and the scope thereof is determined by the claims which follow.

What is claimed is:

1. An accumulating conveyor including:
 (a) a plurality of accumulating zones arranged in end-to-end relationship and defining a conveying path for item flow, said plurality of accumulating zones including an infeed accumulating zone relative to product flow along said conveying path, and a discharge accumulating zone relative to product flow along said conveying path, each said accumulating zone separately engageable and disengageable with a drive force;
 (b) an accumulating controller comprising an accumulation module within each accumulating zone, each accumulation module including:
   (i) logic circuitry;
   (ii) a sensor in communication with said logic circuitry;
   (iii) input/output connections in communication with said logic circuitry including a drive/no drive signal output;
 (c) wherein said accumulation modules are linked together via said input/output connections such that each accumulation module is in communication with an adjacent downstream accumulation module relative to product flow and an adjacent upstream accumulation module relative to product flow, and, in the case of an infeed accumulation module within said indeed accumulation zone said infeed accumulation module is in communication only with an adjacent downstream accumulation module relative to product flow, and, in the case of a discharge accumulation module within said discharge accumulation module is in communication only with an adjacent upstream accumulation module relative to product flow; and
 (d) wherein said accumulation controller is selectively settable to convey product along the accumulating conveyor either in a singulation mode of operation or in a slug mode of operation.

2. The accumulating conveyor of claim 1, wherein said accumulation controller is settable in either the singulation or slug mode through one of said accumulation modules.

3. The accumulating conveyor of claim 2, wherein said one of said accumulation modules is said discharge accumulation module and the mode of operation is settable via a plug in communication with the input/output connections of the discharge accumulation module.

4. The accumulating conveyor of claim 1, wherein said sensor is a photoelectric sensor.

5. The accumulating conveyor of claim 1, wherein said logic circuitry is a microprocessor.

6. The accumulating conveyor of claim 1, wherein each accumulation module includes a sleep mode whereby when a sensor signal detecting a product within its respective accumulating zone is absent and no product detect signal is received through its respective control connections from the immediately upstream accumulation module for a given time period, a no-drive signal is transmitted to deactivate the respective accumulating zone, and a drive signal is transmitted to reactivate the respective accumulating zone when either a sensor signal detecting a product within its respective zone is received by the logic circuitry or a product detect signal is received from the immediately upstream accumulation module.

7. The accumulating conveyor of claim 6, wherein said given time period is settable.

8. The accumulating conveyor of claim 7, wherein said given time period is settable via a dipswitch for 5 or 15 seconds.

9. The accumulating conveyor of claim 1, wherein each accumulating module includes a selectively actuable zone stop input adapted to receive a zone stop signal that causes the logic circuitry to provide a no-drive signal to deactivate its respective accumulating zone upon receipt by the logic circuitry of a sensor signal indicating that the product is within its respective accumulating zone.

10. The accumulating conveyor of claim 1, wherein
   (a) when said accumulation controller is set in said singulation mode, each accumulation module transmits a product detect signal via said control connections to an adjacent upstream accumulation module relative to product flow and to an adjacent downstream accumulation module relative to product flow if the respective sensor of the accumulation module detects the product within the respective accumulating zone, and, if an accumulation module receives a product detect signal from an adjacent downstream accumulation module relative to product flow and a sensor signal from its respective sensor, its respective logic circuitry provides a no drive signal to temporarily stop its respective accumulating zone until its respective sensor signal is no longer received or the product detect signal from its adjacent downstream accumulation module ceases whereby a drive signal is provided to start its accumulating zone; and
   (b) when said accumulation controller is set in said slug mode, each accumulation module performs in the same manner as in the singulation mode except when the logic circuitry of an accumulation module receives a sensor signal indicating that product is present within its respective accumulating zone, the product detect upstream signal is time delayed for a predetermined time period which is then transmitted unless the sensor signal stops indicating no package and the predetermined time period is reset.

11. The accumulating conveyor of claim 10, further comprising:
   a jam protection disable switch, which when activated sets said predetermined time period to infinity.

12. A sensing module for controlling the application of a drive force to a respective accumulating zone of an accumulation conveyor, the sensing module comprising:
   a body;
   logic circuitry within said body;
   a sensor in said body and coupled to said logic circuitry, said sensor providing an item sensed signal to said logic circuitry when an item is within its respective accumulating zone; and
   control connections in communication with said logic circuitry and including an upstream product detect signal input adapted to receive a product detect signal downstream output from an upstream sensing module relative to product flow, a downstream product detect signal input adapted to receive a product detect signal upstream output from a downstream sensing module relative to product flow, a product detect signal upstream output adapted to transmit a product detect signal to an upstream module, a product detect signal downstream output adapted to transmit a product detect signal to a downstream module, and a drive/no-drive force selection output in communication with the drive force that selectively enables and disables the drive force for the respective accumulating zone;
   wherein said logic circuitry is settable in either a singulation mode or a slug mode and evaluates said signals to determine whether to output a drive or no drive force selection signal.

13. The module of claim 12, further comprising:
   a selectively engageable sleep mode that allows the drive force for the respective accumulating zone to be temporarily disabled after a given period of time; and
   a zone stop input adapted to receive a zone stop signal which causes the logic circuitry to provide a no-drive signal when an item is detected within the respective zone.

14. The module of claim 12, wherein said logic circuitry is a microprocessor and said sensor is a photoelectric sensor.

15. The module of claim 12, further comprising an integral communications cable terminating in a plug adapted to be received by said control connections in order to couple one module to another.

16. An accumulation controller for controlling the flow of items being conveyed on an accumulating conveyor, the accumulation controller comprising:
   a plurality of accumulation modules, one in each accumulating zone, coupled in a daisy-chain manner, each module in communication with its immediately adjacent modules or module in the case of a last module in a last accumulating zone relative to product flow and in the case of a first module in a first accumulating zone, wherein the accumulation controller is selectively settable via one module in a singulation mode or a slug mode.

17. The accumulation controller of claim 16, wherein each module comprises:
   (a) logic circuitry to evaluate any incoming signals, and provide any outgoing signals;
   (b) a sensor in communication with said logic circuitry and providing said logic circuitry with a sensor signal upon detection of the presence of a product within its respective accumulating zone;

(c) control connections in communication with said logic circuitry and adapted to receive and send various signals; and (e) a drive/no drive signal output.

18. The accumulating conveyor of claim 16, wherein each accumulation module includes a sleep mode whereby when a sensor signal detecting a product within its respective accumulating zone is absent and no product detect signal is received through its respective control connections from the immediately upstream accumulation module for a given time period, a no-drive signal is transmitted to deactivate the respective accumulating zone, and a drive signal is transmitted to reactivate the respective accumulating zone when either a sensor signal detecting a product within its respective zone is received by the logic circuitry or a product detect signal is received from the immediately upstream accumulation module.

19. The accumulating conveyor of claim 16, wherein each accumulating module includes a selectively actuable zone stop input adapted to receive a zone stop signal that causes the logic circuitry to provide a no-drive signal to deactivate its respective accumulating zone upon receipt by the logic circuitry of a sensor signal indicating that the product is within its respective accumulating zone.

20. The accumulating conveyor of claim 16, further comprising:

a jam protection disable switch, which when enabled sets said predetermined time period to infinity.

* * * * *